(12) United States Patent
Gin et al.

(10) Patent No.: US 7,724,280 B2
(45) Date of Patent: May 25, 2010

(54) DUAL SURVEILLANCE CAMERA SYSTEM

(75) Inventors: Jack Gin, Burnaby (CA); Dan Hsu, Surrey (CA)

(73) Assignee: Bosch Security Systems BV, Eindhoven (NL)

( * ) Notice: Subject to any disclaimer, the term of this patent is extended or adjusted under 35 U.S.C. 154(b) by 1026 days.

(21) Appl. No.: 10/569,827

(22) PCT Filed: Aug. 30, 2004

(86) PCT No.: PCT/CA2004/001541

§ 371 (c)(1),
(2), (4) Date: Feb. 28, 2006

(87) PCT Pub. No.: WO2005/022475

PCT Pub. Date: Mar. 10, 2005

(65) Prior Publication Data

US 2007/0013779 A1    Jan. 18, 2007

(30) Foreign Application Priority Data

Aug. 28, 2003   (CA) .................................. 2438939

(51) Int. Cl.
*H04N 13/02*   (2006.01)
*H04N 5/30*    (2006.01)
*H04N 5/335*   (2006.01)
*H04N 5/33*    (2006.01)
*H04N 7/18*    (2006.01)

(52) U.S. Cl. .................... 348/159; 348/47; 348/162; 348/164; 348/143

(58) Field of Classification Search .............. 348/159, 348/164, 47, 143, 162
See application file for complete search history.

(56) References Cited

U.S. PATENT DOCUMENTS

| 6,179,434 B1* | 1/2001 | Saraiji ........................ 362/125 |
| 6,377,191 B1* | 4/2002 | Takubo ........................ 340/937 |
| 6,550,949 B1* | 4/2003 | Bauer et al. ................. 362/545 |
| 2002/0051578 A1* | 5/2002 | Imagawa et al. ........... 382/224 |
| 2002/0130953 A1* | 9/2002 | Riconda et al. ............. 348/115 |

* cited by examiner

*Primary Examiner*—Nhan T Tran
*Assistant Examiner*—Chia-Wei A Chen
(74) *Attorney, Agent, or Firm*—Paul D. Gornall

(57) ABSTRACT

A surveillance system having two specialized surveillance cameras with corresponding specialized illuminators is provided in a dual compartment container that eliminates internal light reflection problems by separating each camera and corresponding illuminator while combining each camera with an alternate illuminator, rendering the system more accurate, yet more compact and suited to unobtrusive placement. Considerable heat is generated by the specialized illuminators, requiring a heat sink to preserve illuminator life expectancy and to prevent the adjacent cameras from being adversely affected by the heat. Another feature enabling the system to work in its compact form despite the heat from the illuminators is that the protective case itself is adapted to be a heat sink for the illuminators.

15 Claims, 2 Drawing Sheets

DUAL SURVEILLANCE CAMERA SYSTEM

BACKGROUND OF THE INVENTION

This invention relates to security cameras and the obtaining of optimal images under varying ambient light conditions. In some circumstances, it is most effective to obtain visible light images. In other situations, such as poor visibility due to smoke or fog, infrared images give the best information about people and objects in the surveillance situation. Versatility and adaptability of the security system to varying conditions is desired.

With security cameras it is usual to place a protective translucent pane or dome over the camera and illuminator, to guard it against the elements or intentional damage by intruders or others who do not wish to be observed.

The combination of versatile camera systems with protective cases has resulted in many such security systems being bulky and difficult to place in a discreet, unobtrusive way.

SUMMARY OF THE INVENTION

This invention provides a surveillance system having two specialized surveillance cameras with corresponding specialized illuminators in a dual compartment container that eliminates internal light reflection problems by an arrangement which concomitantly renders the system more compact and suited to unobtrusive placement. Considerable heat is generated by the specialized illuminators, requiring a heat sink to preserve illuminator life expectancy and to prevent the adjacent cameras from being adversely affected by the heat. Another feature enabling the system to work in its compact form despite the heat from the illuminators is that the protective case itself is adapted to be a heat sink for the illuminators.

The system achieves its compactness by having a first camera adapted for recording images under a first type of illumination, a second camera adapted for recording images under a second type of illumination, a first illuminator for providing the first type of illumination, a second illuminator for providing the second type of illumination, and two compartments, each having a translucent pane. The panes substantially face the same way. The first compartment contains the first camera and the second illuminator. The second compartment contains the second camera and the first illuminator. The first and second compartments are separated from each other by an opaque wall preventing light from the first illuminator originating in the second compartment from reflecting off the second translucent pane directly to the first camera and preventing light from the second illuminator originating in the first compartment from reflecting off the first translucent pane directly to the second camera.

The first camera records images when the second illuminator is turned on, the second camera records images when the first illuminator is turned on, and the system switches between using the first illuminator and the second illuminator, depending on which type of illumination provides the best recorded image via its respective camera in ambient conditions for the system from time to time.

In one preferred embodiment, the first camera is a colour camera for observation under visible light, the second camera is a monochrome camera for observation under infrared illumination, the first illuminator is a visible light illuminator, and the second illuminator is an infrared illuminator. The first and second compartments are formed by a box with a dividing wall, the box being formed with cooling fins of heat-conducting material. These features enable a working, lasting, dual surveillance camera and dual illuminator system in which the compartments are small enough resemble a minature speaker cabinet for unobtrusive yet stylish placement. Alternatively the compactness can be used to have a working, lasting, dual surveillance camera and dual illuminator system fit covertly behind an electrical switch box decor cover plate.

The benefits of this dual camera system of imaging are enhanced if the colour camera has a lens optimized for colour viewing with infra-red filtering, and the monochrome camera has a lens optimized for monochrome viewing with visible light filtering. The monochrome camera could be supercharged electronically for infrared sensitivity, with the infrared illuminator giving illumination in the range of from 805 to 995 nanometers of electromagnetic radiation. Although it is possible for the electronics of a colour CCTV camera to share a lens with a monochrome CCTV camera, each camera in the present system should have its own lens, and each of the cameras can then have separate varifocal control to enable a switch of mode from day to night operation without a focal shift of the lens, which would otherwise be required when shifting from colour to monochrome camera output to obtain the best imaging.

DETAILED DESCRIPTION

Figure 1:
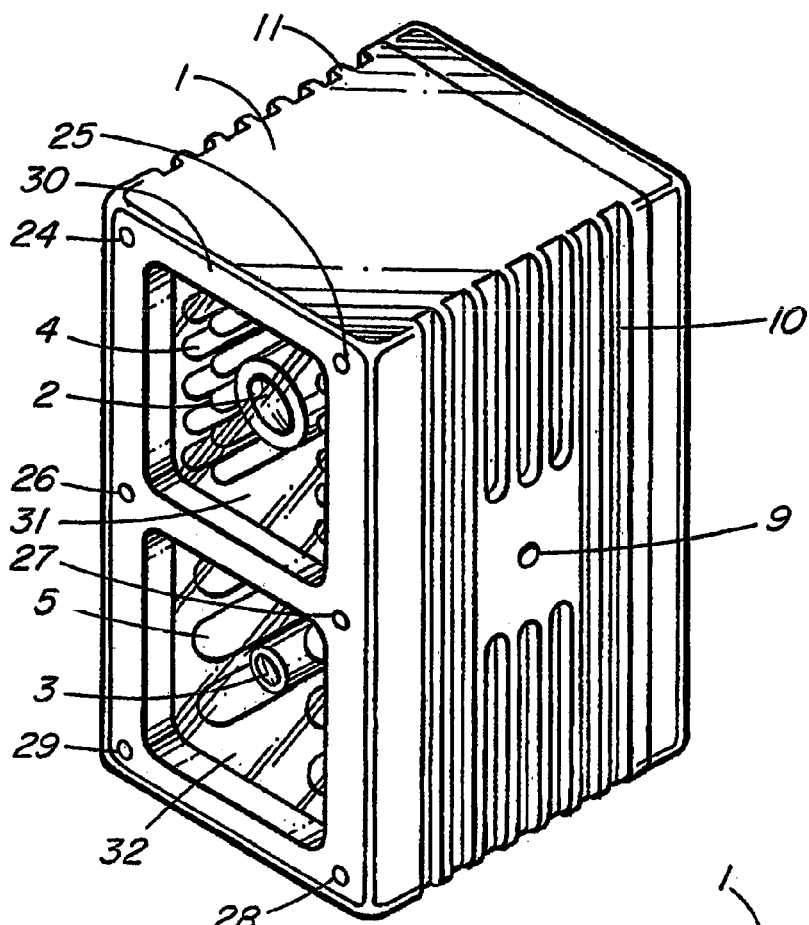
FIG. 1 is a perspective view of an embodiment of the dual surveillance camera system of the present invention.
Figure 2:
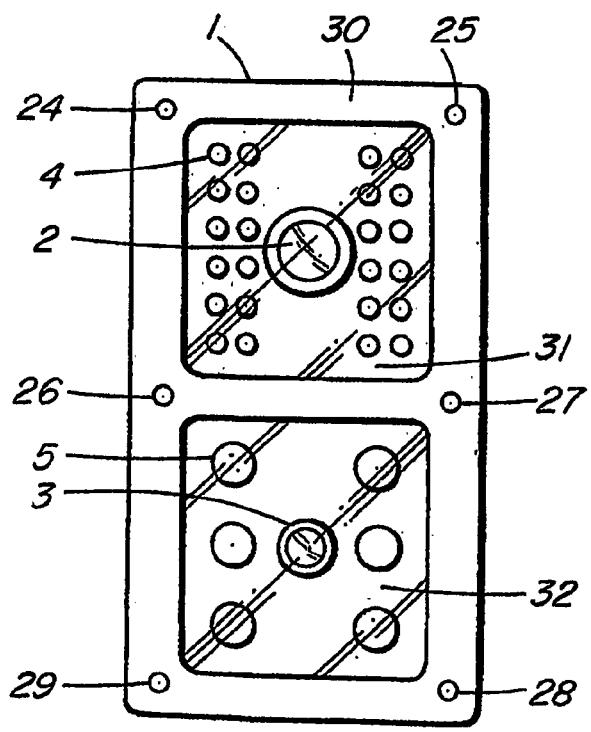
FIG. 2 is a frontal view of the system of FIG. 1.

Referring to FIGS. 1 and 2, the dual surveillance camera system case 1 having in its top compartment a first (colour) camera 2, complete with a lens optimized for colour with infra-red filtering, adapted for recording images under a first type of illumination provided by the first (visible light) illuminator 5 in the bottom compartment, and having in its bottom compartment a second (monochrome) camera 3, complete with a lens optimized for monochrome viewing with visible light filtering, for recording images under a second type of illumination provided by the second (infrared) illuminator 4.

A cover 30 secures translucent panes 31 and 32 over the respective cameras and illuminators, with screws at 24 through 29. The case 1 is made of heat-conductive material and has integral cooling fins as at 10 and 11 to increase surface area contact with surrounding air.

The infrared illuminator 4 and the visible light illuminator 5 preferably comprise banks of infrared and visible light emitting diodes (LEDs) respectively. The LEDs give efficient, bright light for their size and energy consumption. The LEDs give off considerable heat, which should be dissipated by using heat sinks connected to the backboards of the LEDs, in order to keep them from overheating and shortening their potentially long life span. The cameras themselves can be adversely affected if too much heat were allowed to build up in the case 1.

Figure 3:
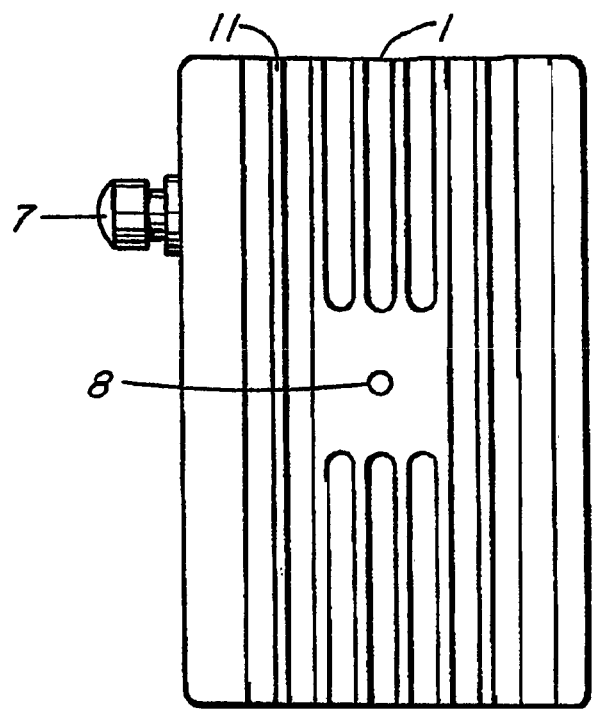
FIG. 3 is a side view of the system of FIG. 1.
Figure 4:
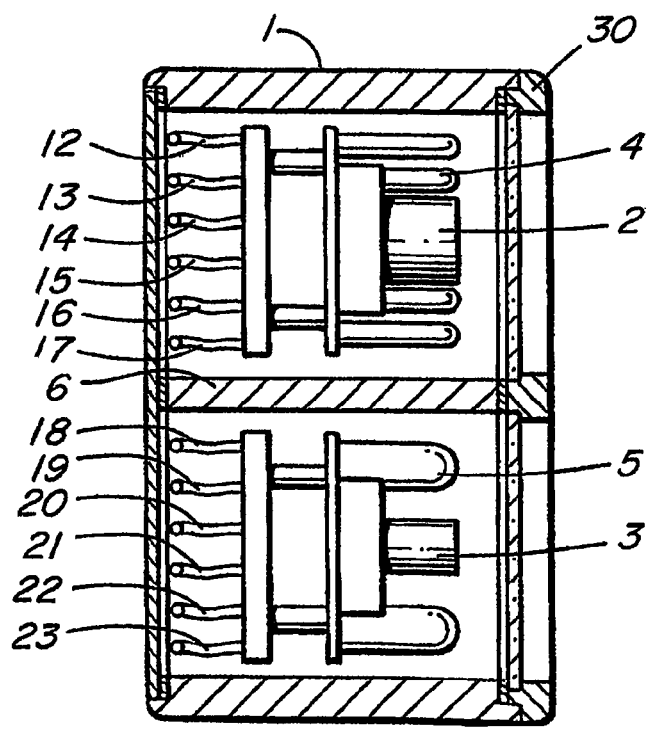
FIG. 4 is a side cross-section of the system of FIG. 1.

Referring to FIGS. 3 and 4, the first (colour) illuminator 5 in the bottom compartment is powered via wires 18 and 19, while its corresponding (colour) camera 2 in the top compartment is powered via wires 14 and 15, operating for example a varifocal colour lens control, and the camera's video output signal is sent via wires 16 and 17. Likewise, the second (monochrome) illuminator 4 in the top compartment is powered via wires 12 and 13, while its corresponding (monochrome) camera 3 in the bottom compartment is powered via wires 20 and 21, operating for example a varifocal mono lens control, and that camera's video output signal is sent via wires 22 and 23. The first camera thus records images when the second illuminator is turned on, the second camera records images when the first illuminator is turned on, and the system switches between using the first illuminator and the second illuminator, depending on which type of illumination provides the best recorded image via its respective camera in the ambient conditions extant for the system from time to time. All the wires are bundled for exit at cable terminal 7, where the system can be connected for remote control and video recording and processing.

The dividing wall 6 is opaque and completely separates the first and second compartments, to prevent light from the first illuminator 5 originating in the second compartment from reflecting off the second translucent pane 32 directly to the first camera 2 and to prevent light from the second illuminator 4 originating in the first compartment from reflecting off the first translucent pane 31 directly to the second camera 3. It is useful to avoid such premature, internal reflection of the illumination because it would be essentially foreground "snow" or "video noise" that would reduce the quality of the imaging from the light returning from the scene being observed by the respective camera. The system thus provides for higher quality images, optimized as between visible light and infrared light.

The side hole 9 shown in FIG. 1 facilitates mounting of the system with a bracket, in conjunction with the corresponding opposite side hole 8 shown in FIG. 3.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. A dual surveillance camera system comprising:
    a) a first camera adapted for recording images under a first type of illumination;
    b) a second camera adapted for recording images under a second type of illumination;
    c) a first illuminator for providing the first type of illumination;
    d) a second illuminator for providing the second type of illumination;
    e) a first compartment having a first translucent viewing pane and containing the first camera and the second illuminator;
    f) a second compartment having a second translucent viewing pane and containing the second camera and the first illuminator;
    in which the first and second compartments are separated from each other by an opaque wall preventing light from the first illuminator originating in the second compartment from reflecting off the second translucent pane directly to the first camera and preventing light from the second illuminator originating in the first compartment from reflecting off the first translucent pane directly to the second camera.

2. The dual surveillance camera system of claim 1, in which the first camera records images when the first illuminator is turned on, the second camera records images when the second illuminator is turned on, and the system switches between using the first illuminator and the second illuminator, depending on which type of illumination provides the best recorded image via its respective camera in ambient conditions fix the system from time to time.

3. The dual surveillance camera system of claim 2, in which
    a) the first camera is a colour camera for observation under visible light;
    b) the second camera is a monochrome camera for observation under infrared illumination;
    c) the first illuminator is a visible light illuminator;
    d) the second illuminator is an infrared illuminator;
    e) the first and second compartments are formed by a box with a dividing wall;
    f) the box is a heat sink wit cooling fins formed of a heat-conducting material.

4. The dual surveillance camera system of claim 3, in which the compartments are miniaturized to fit within standard electrical switch box dimensions in order to be adapted to be hidden behind a translucent decor switch plate.

5. The dual surveillance camera system of claim 3 in which:
    a) the colour camera has a lens optimized for colour viewing, with infra-red filtering;
    b) the monochrome camera has a lens optimized for monochrome viewing, with visible light filtering;
    c) the monochrome camera is supercharged for infrared sensitivity;
    d) the infrared illuminator gives illumination in the range of from 805 to 995 nanometers of electromagnetic radiation;
    e) the colour camera and the monochrome camera each have an independent lens having a separate varifocal control to enable a switch of mode from day to night operation without a focal shift.

6. The dual surveillance camera system of claim 1, in which:
    a) the first camera is a colour camera for observation under visible light;
    b) the second camera is a monochrome camera for observation under infrared illumination;
    c) the first illuminator is a visible light illuminator;
    d) the second illuminator is an infrared illuminator.

7. The dual surveillance camera system of claim 6, in which the colour camera has a lens optimized for colour viewing, with infra-red filtering.

8. The dual surveillance camera system of claim 6, in which the monochrome camera has a lens optimized for monochrome viewing, with visible light filtering.

9. The dual surveillance camera system of claim 6, in which the monochrome camera is supercharged electronically for infrared sensitivity.

10. The dual surveillance camera system of claim 6, in which the infrared illuminator gives illumination in the range of from 805 to 995 nanometers of electromagnetic radiation.

11. The dual surveillance camera system of claim 6, in which the colour camera and the monochrome camera each have an independent lens having a separate varifocal control to enable a switch of mode from day to night operation without a focal shift.

12. The dual surveillance camera system of claim 1, in which the first and second compartments are formed by a box with a dividing wall.

13. The dual surveillance camera system of claim 12, in which the compartments are miniaturized to fit within standard electrical switch box dimensions in order to be adapted to be hidden behind a translucent decor switch plate.

14. The dual surveillance camera system of claim 1, in which the first and second compartments have cooling fins formed of a heat-conducting material.

15. The dual surveillance camera system of claim 1, in which the first and second compartments are contained in a box that is a heat sink.

* * * * *